(12) United States Patent
Johnson et al.

(10) Patent No.: US 7,394,988 B1
(45) Date of Patent: Jul. 1, 2008

(54) DUAL BAND WIRELESS COMMUNICATION HAVING HIGH AVAILABILITY AND HIGH BANDWIDTH

(75) Inventors: Harold W. Johnson, Roach, MO (US); James J. Pan, Foster City, CA (US); Mark Evans, San Mateo, CA (US)

(73) Assignee: Sprint Communications Company L.L.P., Overland Park, KS (US)

( * ) Notice: Subject to any disclaimer, the term of this patent is extended or adjusted under 35 U.S.C. 154(b) by 627 days.

(21) Appl. No.: 10/191,240

(22) Filed: Jul. 9, 2002

(51) Int. Cl.
*H04B 10/00* (2006.01)

(52) U.S. Cl. ............................. 398/115; 398/46; 398/74

(58) Field of Classification Search ................. 398/46, 398/74, 115, 116, 118, 120, 135
See application file for complete search history.

(56) References Cited

U.S. PATENT DOCUMENTS

| | | | | |
|---|---|---|---|---|
| 5,585,953 A | * | 12/1996 | Zavrel | 398/115 |
| 5,890,112 A | * | 3/1999 | Kitabatake | 704/229 |
| 6,314,163 B1 | * | 11/2001 | Acampora | 379/56.2 |
| 6,763,195 B1 | * | 7/2004 | Willebrand et al. | 398/115 |
| 2002/0094842 A1 | * | 7/2002 | Aburakawa et al. | 455/561 |
| 2002/0122231 A1 | * | 9/2002 | Verbana et al. | 359/145 |
| 2004/0062551 A1 | * | 4/2004 | ElBatt et al. | 398/115 |

* cited by examiner

*Primary Examiner*—Dzung Tran

(57) ABSTRACT

A communication system receives information from a first communication link. The communication system transfers a free-space optical signal carrying the information and transfers a high-GHz wireless signal carrying the information. The communication system receives the free-space optical signal carrying the information and receives the high-GHz wireless signal carrying the information. The communication system assesses communication performance for the free-space optical signal and the high-GHz wireless signal, and based on the communication performance, selects between the free-space optical signal and the high-GHz wireless signal to provide the information. The communication system transfers the information to a second communication link based on the selection.

20 Claims, 2 Drawing Sheets

DUAL BAND WIRELESS COMMUNICATION HAVING HIGH AVAILABILITY AND HIGH BANDWIDTH

BACKGROUND OF THE INVENTION

1. Field of the Invention

The invention is related to the field of wireless communications, and in particular, to a high bandwidth, dual-band system that assesses communication performance to provide high availability.

2. Statement of the Problem

Wireless communication systems use various frequency spectra to transfer wireless communication signals. Microwave systems use spectrum between one gigahertz (GHz) and 30 GHz where one GHz equals one billion cycles per second. Free-space optical systems use spectrum above 10 THz where one THz equals one trillion cycles per second.

Weather events adversely affect wireless systems transmitting above 10 GHz. To address the weather problem, free-space optical systems have been combined with weather-resilient microwave systems transmitting at 2.4 GHz. Upon failure of the free-space optical system due to a weather event, the microwave system is used to transfer traffic formerly carried by the free-space optical system. Since the microwave system does not have the capacity to transfer all of this traffic, the traffic must be prioritized, so the higher priority traffic can be transferred while the lower priority traffic is stored for subsequent transmission. Thus, the transfer of the lower priority traffic is delayed, and if there is not enough storage, portions of the lower priority traffic may be lost altogether.

SUMMARY OF THE SOLUTION

The invention helps solve the above problems with a high-availability and high-bandwidth wireless communication system. This communication system uses a free-space optical communication system and a high-GHz wireless communication system. The free-space optical communication system works well in weather patterns that adversely affect high-GHz wireless communications, and conversely, the high-GHz wireless communication system works well in weather patterns that adversely affect free-space optical communications. Advantageously, the high-GHz communication system has far greater capacity than prior microwave systems, so the communication system maintains high bandwidth in the event of a free-space optical system failure. In many cases, traffic prioritization and delay is unnecessary during weather-related switch-overs between the free-space optical communication system and the high-GHz wireless communication system.

Some examples of the invention include a method of operating a communication system. The method comprises: receiving information from a first communication link; transferring a free-space optical signal carrying the information and transferring a high-GHz wireless signal carrying the information; receiving the free-space optical signal carrying the information and receiving the high-GHz wireless signal carrying the information; assessing communication performance for the free-space optical signal and the high-GHz wireless signal, and based on the communication performance, selecting between the free-space optical signal and the high-GHz wireless signal to provide the information; and transferring the information to a second communication link based on the selection.

Some examples of the invention include a communication system that comprises a line interface, free-space optical interface, high-GHz wireless interface, and control system. The line interface is configured to receive first information from a communication link and transfer second information to the communication link. The free-space optical interface is configured to receive the first information from the line interface and transfer a first free-space optical signal carrying the first information, and to receive a second free-space optical signal carrying the second information and transfer the second information. The high-GHz wireless interface is configured to receive the first information from the line interface and transfer a first high-GHz wireless signal carrying the first information, and to receive a second high-GHz wireless signal carrying the second information and transfer the second information. The control system is configured to assess communication performance for the second free-space optical signal and the second high-GHz wireless signal, and based on the communication performance, select between the second free-space optical signal and the second high-GHz wireless signal to provide the second information to the line interface for transfer to the communication link.

In some examples of the invention, the communication performance comprises bit errors, severe bit error seconds, framing errors, time without bit errors, time without severe bit error seconds, and/or time without framing errors. In some examples of the invention, the high-GHz wireless signals comprise local multipoint distribution signals, V-band signals, or W-band signals. Some examples of the invention include a user interface configured to allow a user to select a primary receive signal and performance assessment metrics and thresholds.

DETAILED DESCRIPTION OF THE INVENTION

Figure 1:
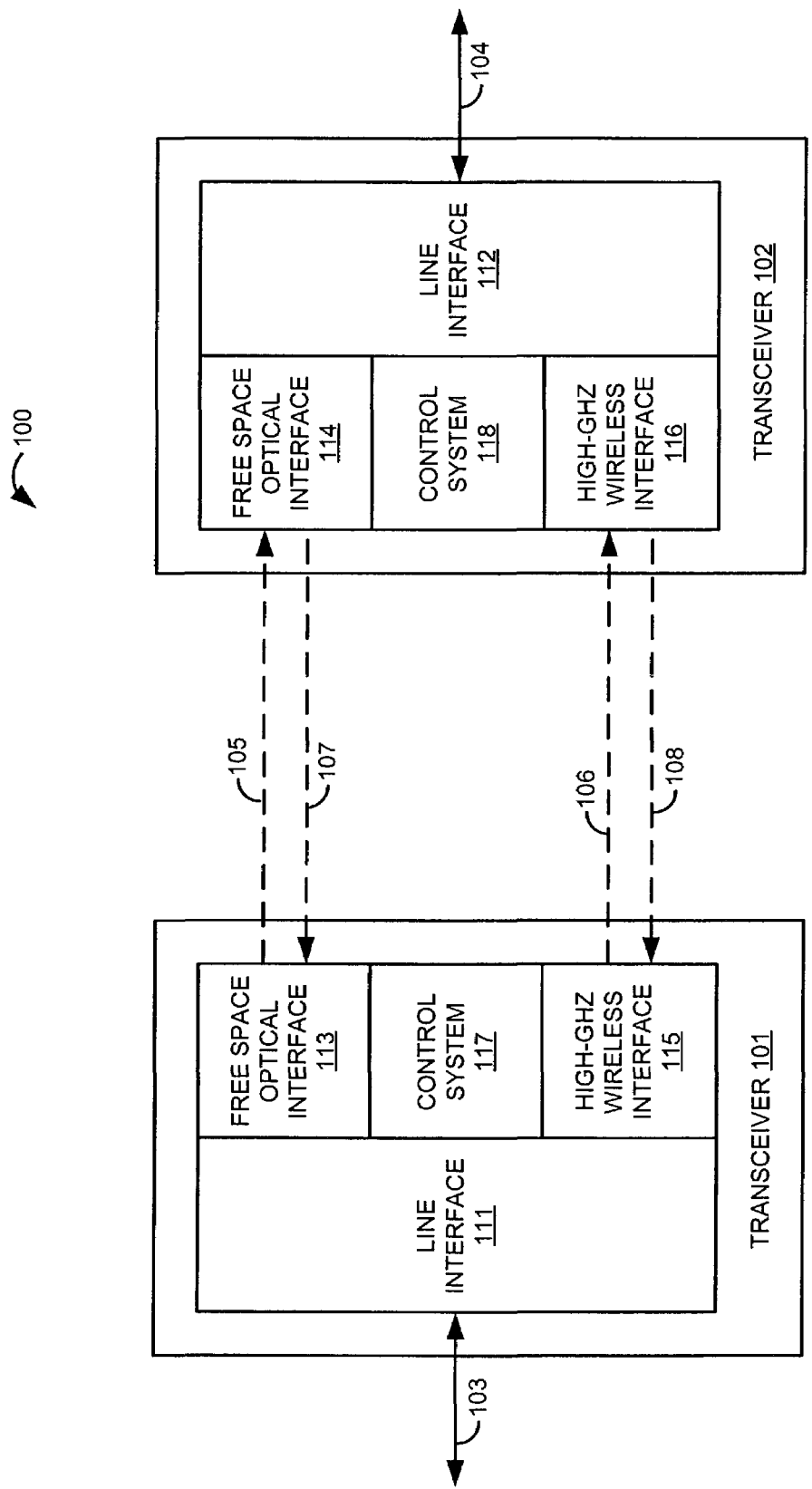
FIG. 1 illustrates a communication system in an example of the invention.
Figure 2:
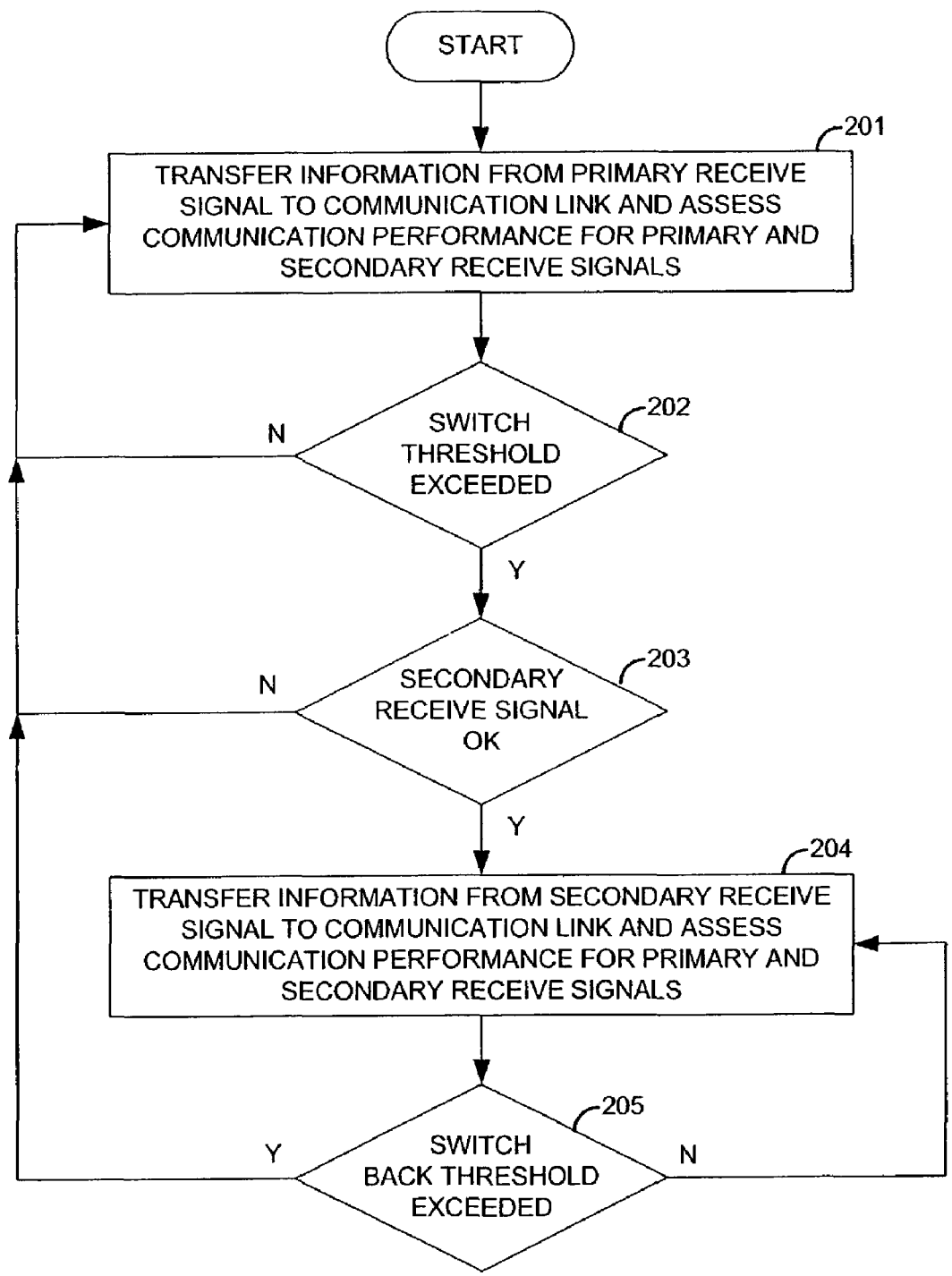
FIG. 2 illustrates communication system operation in an example of the invention.

FIGS. 1-2 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

FIG. 1 illustrates communication system 100 in an example of the invention. Communication system 100 includes transceivers 101 and 102. Transceiver 101 includes line interface 111, free-space optical interface 113, high-GHz wireless interface 115, and control system 117. Transceiver 102 includes line interface 112, free-space optical interface 114, high-GHz wireless interface 116, and control system 118. Line interface 111 is coupled to communication link 103, and line interface 112 is coupled to communication link 104.

Based on this disclosure, those skilled in the art will appreciate how to modify existing communication systems to make communication system 100. Interfaces 111-116 could be conventional devices in some examples of the invention, or could be readily adapted from conventional devices in other examples of the invention. Control systems 117 and 118 could be comprised of processing circuitry. For example, application specific integrated circuitry could be fabricated to form control systems 117 and 118. In addition, general purpose microprocessors and memory along with software could be used for control systems 117 and 118. Transceivers 101 and 102 could each be implemented within a single housing or form factor.

Line interface 111 receives information from communication link 103 and transfers the information to both free space optical interface 113 and high-GHz wireless interface 115. Free-space optical interface 113 receives the information from line interface 111 and transfers free-space optical signal 105 carrying the information. High-GHz wireless interface 115 receives the information from line interface 111 and transfers high-GHz wireless signal 106 carrying the information. Free-space optical interface 114 receives free-space optical signal 105 carrying the information. High-GHz wireless interface 116 receives high-GHz wireless signal 106 carrying the information. Thus, interfaces 113-116 simultaneously transfer and receive the information in wireless signals 105-106.

Control system 118 assesses communication performance for free-space optical signal 105 and the high-GHz wireless signal 106. Based on the communication performance, control system 118 selects between free-space optical signal 105 and high-GHz wireless signal 106 to provide the information. Line interface 112 receives the information from free-space optical interface 114 or high-GHz wireless interface 116 based on the selection by control system 118. Line interface 112 transfers the information to communication link 104.

Line interface 112 receives information from communication link 104 and transfers the information to both free space optical interface 114 and high-GHz wireless interface 116. Free-space optical interface 114 receives the information from line interface 112 and transfers free-space optical signal 107 carrying the information. High-GHz wireless interface 116 receives the information from line interface 112 and transfers high-GHz wireless signal 108 carrying the information. Free-space optical interface 113 receives free-space optical signal 107 carrying the information. High-GHz wireless interface 115 receives high-GHz wireless signal 108 carrying the information. Thus, interfaces 113-116 simultaneously transfer and receive the information in wireless signals 107-108.

Control system 117 assesses communication performance for free-space optical signal 107 and high-GHz wireless signal 108. Based on the communication performance, control system 117 selects between free-space optical signal 107 and high-GHz wireless signal 108 to provide the information. Line interface 111 receives the information from free-space optical interface 113 or high-GHz wireless interface 115 based on the selection by control system 117. Line interface 111 transfers the information to communication link 103.

In the context of the invention, the term "high-GHz" means between 10 GHz and 10 THz. High-GHz wireless signals 106 and 108 could be local multipoint distribution signals, V-band signals, W-band signals, or some other type of high-GHz signals that propagate through the air. Free-space optical signals propagate through the air at frequencies above 10 THz. Free-space optical signals 105 and 107 could be laser signals, infrared signals, or some other light wave signals that propagate through the air.

Control systems 117 and 118 could be implemented in various ways, and could be completely or partially integrated within interfaces 111-116. For example, interfaces 113 and 115 could transfer their received signals to an external control system 117 for performance assessment and signal selection, and control system 117 would transfer the information from the selected signal to line interface 111. Alternatively, interfaces 111 and 113 could include integrated portions of control system 117 to assess performance, and an external portion of control interface 117 could select and transfer the information based on the performance assessment. Control system 117 could be implemented completely within interfaces 111 and 113, or completely within line interface 111. Based on this disclosure, those skilled in the art will appreciate various other implementations that are also included in the invention.

FIG. 2 illustrates communication system 100 operation in an example of the invention. The reference numbers from FIG. 2 are indicated parenthetically below. In this example, free-space optical signal 107 is the primary receive signal and high-GHz wireless signal 108 is the secondary receive signal. In addition, the operation is described for transceiver 101, and the operation for transceiver 102 would be similar.

To start, transceiver 101 transfers the information from the primary receive signal to communication link 103 (201). Transceiver 101 also assesses communication performance for the primary and secondary receive signals (201). If the performance of the primary receive signal exceeds a switch threshold (202), and if the performance of the secondary receive signal is acceptable (203), then transceiver 101 transfers the information from the secondary receive signal to communication link 103 (204). Thus, transceiver 101 has switched from using free-space optical signal 107 to using high-GHz wireless signal 108 to provide the information to communication link 103.

Transceiver 101 continues to assess communication performance for the primary and secondary receive signals (204). If the performance of the primary receive signal exceeds a switchback threshold (205), then transceiver 101 again transfers the information from the primary receive signal to communication link 103 (201). Thus, transceiver 101 has switched back to using free-space optical signal 107 to provide the information to communication link 103. If desired, the switchback threshold can be selected to prevent premature switchbacks that result in continuous switching between primary and secondary receive signals.

Performance assessment could include bit errors, severe bit error seconds, framing errors, time without bit errors, time without severe bit error seconds, time without framing errors, and/or some other type of performance metric. One example of a severe bit error second is a one second time period that has a bit error rate of $10^{-3}$. Examples of the switch threshold could include a bit error rate or an average bit error rate, a number of consecutive severe bit error seconds or an average number of bit error seconds, a number of consecutive frame errors, an average number of frame errors, or some other type of performance metric. Examples of the acceptability of the secondary receive signal could include time without bit errors, time without severe bit error seconds, time without framing errors, bit error rate, average bit error rate, number of consecutive severe bit error seconds, average number of bit error seconds, number of consecutive frame errors, average number of frame errors, or some other type of performance metric. Examples of the switchback threshold could include time without bit errors, time without severe bit error seconds, time without framing errors, bit error rate, average bit error rate, number of consecutive severe bit error seconds, average number of bit error seconds, number of consecutive frame errors, average number of frame errors, or some other type of performance metric. Various combinations of the above metrics may be used for performance assessment.

Control systems 117-118 could be programmable and include a user interface. For example, the user interface could indicate available selections to a user and receive user selections from the user. The user interface could allow the user to select the primary and secondary receive signals. The user interface could allow the user to select the metrics or metric combinations that are used for the performance assessment. The user interface could allow the user to select settings and levels for these selected metrics.

The selection of primary and secondary receive signals can be based on weather patterns in the area. Free-space optical communications are adversely affected by fog and snow, so in areas with heavy fog or snow patterns, the high-GHz wireless signal might be the primary receive signal, and the free-space optical signal might be the secondary receive signal. High-GHz communications are adversely affected by rain or oxygen/carbon dioxide absorption, so in areas with heavy rain or oxygen/carbon dioxide absorption patterns, the free-space optical signal might be the primary receive signal, and the high-GHz signal might be the secondary receive signal.

Advantageously, free-space optical communications work well in weather patterns that adversely affect high-GHz wireless communications, and conversely, high-GHz wireless communications work well in weather patterns that adversely affect free-space optical communications. Since communication system 100 effectively switches between these systems based on communication performance, communication system 100 is able to provide highly-available wireless communication services at very high bandwidths.

The invention claimed is:

1. A method of operating a communication system comprising:
   receiving information from a first communication link;
   transferring a free-space optical signal carrying the information and transferring a high-GHz wireless signal carrying the information;
   receiving the free-space optical signal carrying the information and receiving the high-GHz wireless signal carrying the information;
   selecting a first one of the free-space optical signal and the high-GHz wireless signal as a primary receive signal, wherein the remaining one of the free-space optical signal and the high-GHz wireless signal comprises a secondary receive signal, and wherein the primary receive signal initially provides the information to a second communication link;
   assessing communication performance for the primary receive signal and the secondary receive signal;
   while the primary receive signal provides the information to the second communication link, switching to the secondary receive signal based upon a first comparison between the communication performance for the primary receive signal and a first threshold, and a second comparison between the communication performance for the secondary receive signal and a second threshold; and
   while the secondary receive signal provides the information to the second communication link, switching to the primary receive signal based upon a third comparison between the communication performance of the primary receive signal and a third threshold, without considering the communication performance for the secondary receive signal.

2. The method of claim 1 wherein the communication performance comprises bit errors.

3. The method of claim 1 wherein the communication performance comprises severe bit error seconds.

4. The method of claim 1 wherein the communication performance comprises framing errors.

5. The method of claim 1 wherein the communication performance comprises time without bit errors.

6. The method of claim 1 wherein the communication performance comprises time without severe bit error seconds.

7. The method of claim 1 wherein the communication performance comprises time without framing errors.

8. The method of claim 1 wherein the high-GHz wireless signal comprises a local multipoint distribution signal.

9. The method of claim 1 wherein the high-GHz wireless signal comprises one of a V-band signal and a W-band signal.

10. The method of claim 1 wherein:
    selecting the primary receive signal comprises allowing a user to select the primary receive signal; and
    wherein the method further comprises allowing the user to select performance assessment metrics and the first, second, and third thresholds.

11. A communication system comprising:
    a line interface configured to receive first information from a communication link and transfer second information to the communication link;
    a free-space optical interface configured to receive the first information from the line interface and transfer a first free-space optical signal carrying the first information, and to receive a second free-space optical signal carrying the second information and transfer the second information;
    a high-GHz wireless interface configured to receive the first information from the line interface and transfer a first high-GHz wireless signal carrying the first information, and to receive a second high-GHz wireless signal carrying the second information and transfer the second information; and
    a control system configured to:
      select a first one of the second free-space optical signal and the second high-GHz wireless signal as a primary receive signal, wherein the remaining one of the second free-space optical signal and the second high-GHz wireless signal comprises a secondary receive signal, and wherein the primary receive signal initially provides the second information to the line interface for transfer to the communication link;
      assess communication performance for the primary receive signal and the secondary receive signal;
      while the primary receive signal provides the second information to the line interface, switch to the secondary receive signal based upon a first comparison between the communication performance for the primary receive signal and a first threshold, and a second comparison between the communication performance for the secondary receive signal and a second threshold; and
      while the secondary receive signal provides the second information to the line interface, switch to the primary receive signal based upon a third comparison between the communication performance of the primary receive signal and a third threshold, without considering the communication performance for the secondary receive signal.

12. The communication system of claim 11 wherein the communication performance comprises bit errors.

13. The communication system of claim 11 wherein the communication performance comprises severe bit error seconds.

14. The communication system of claim 11 wherein the communication performance comprises framing errors.

15. The communication system of claim 11 wherein the communication performance comprises time without bit errors.

16. The communication system of claim 11 wherein the communication performance comprises time without severe bit error seconds.

17. The communication system of claim 11 wherein the communication performance comprises time without framing errors.

18. The communication system of claim 11 wherein the first high-GHz wireless signal and the second high-GHz wireless signal comprise local multipoint distribution signals.

19. The communication system of claim 11 wherein the first high-GHz wireless signal and the second high-GHz wireless signal comprise V-band signals or W-band signals.

20. The communication system of claim 11 wherein the control system includes a user interface configured to allow a user to select the primary receive signal, performance assessment metrics, and the first, second, and third thresholds.

* * * * *